United States Patent
Dudik et al.

(10) Patent No.: US 10,905,056 B2
(45) Date of Patent: Feb. 2, 2021

(54) SWIVEL JOINT ASSEMBLY (71) Applicant: LINDSAY CORPORATION, Omaha, NE (US)

(72) Inventors: Matthew J. Dudik, Elkhorn, NE (US); Trevis M. Farley, American Falls, ID (US)

(73) Assignee: Lindsay Corporation, Omaha, NE (US)

( * ) Notice: Subject to any disclaimer, the term of this patent is extended or adjusted under 35 U.S.C. 154(b) by 85 days.

(21) Appl. No.: 16/188,609

(22) Filed: Nov. 13, 2018

(65) Prior Publication Data
US 2020/0146227 A1 May 14, 2020

(51) Int. Cl.
*A01G 25/09* (2006.01)
*F16L 27/08* (2006.01)

(52) U.S. Cl.
CPC ........ *A01G 25/092* (2013.01); *F16L 27/0828* (2013.01); *F16L 27/0832* (2013.01)

(58) Field of Classification Search
CPC . A01G 25/092; A01M 7/0075; A01M 7/0078; F16L 27/0828; F16L 27/0832; F16L 37/54; B05B 15/654
USPC ...................... 239/730–733; 285/5
See application file for complete search history.

(56) References Cited

U.S. PATENT DOCUMENTS

| | | | |
|---|---|---|---|
| 1,162,527 A * | 11/1915 | Tabbert | F16L 27/04 285/261 |
| 2,807,500 A * | 9/1957 | Clayton | A01G 25/097 239/733 |
| 3,398,980 A | 8/1968 | Hill | |
| 3,401,956 A | 9/1968 | McCracken | |
| 3,951,165 A | 4/1976 | Seger | |
| 4,041,975 A | 8/1977 | Ames | |
| 4,195,781 A * | 4/1980 | Scholz | A01G 25/092 239/731 |
| 4,269,226 A * | 5/1981 | Allread | F16L 37/23 137/614 |
| 4,290,556 A * | 9/1981 | McConnell | A01G 25/092 239/731 |
| 4,435,006 A * | 3/1984 | Ishigaki | F16L 37/58 138/90 |
| 4,478,438 A | 10/1984 | Elorriaga | |
| 4,564,224 A * | 1/1986 | Korus | A01G 25/092 285/265 |
| 5,997,047 A * | 12/1999 | Pimentel | E03C 1/06 285/55 |

(Continued)

OTHER PUBLICATIONS

Saferack; webpage http://www.swiveljoints.com.

*Primary Examiner* — Alex M Valvis
(74) *Attorney, Agent, or Firm* — Hovey Williams LLP (57) ABSTRACT

A joint assembly for joining first and second pipes of adjacent elevated spans of an irrigation system, the joint assembly comprising a tower end extension, a pivot end extension, an alignment ring, and an alignment bracket. The tower end extension connects to a tower end of the first pipe. The pivot end extension connects to a pivot end of a second pipe. The alignment ring is connected to the tower end extension and is configured to pivot about a yaw axis. The alignment bracket is connected to the pivot end extension and the alignment ring. The alignment bracket is configured to pivot about a pitch axis relative to the alignment ring and to rotate about a roll axis relative to the pivot end extension.

14 Claims, 6 Drawing Sheets

(56) References Cited

U.S. PATENT DOCUMENTS 6,109,535 A * 8/2000 Korus ................... A01G 25/092
                                                    239/1

* cited by examiner

SWIVEL JOINT ASSEMBLY

BACKGROUND

Adjacent elevated spans of moveable irrigation systems are typically connected together via joint assemblies that allow the spans, and hence their pipes, to move relative to each other as they traverse a field. However, conventional joint assemblies only enable limited relative movement about a pitch axis and a yaw axis and not a roll axis. They also have a metal-metal movement interface, which is prone to high friction and galling. This makes movement difficult and often requires maintenance. Conventional joint assemblies also allow limited slope movement for limited span lengths.

SUMMARY

Embodiments of the invention solve the above-mentioned problems and other problems and provide a distinct advance in irrigation pipe joints. More particularly, the invention provides a joint assembly affording three degrees of freedom between pipes of adjacent irrigation spans.

An embodiment of the joint assembly is especially configured for connecting pipes of adjacent irrigation spans of center-pivot irrigation systems or linear move irrigation systems and broadly comprises a tower end extension, tower support structure, a tower end connection flange, a pivot end extension, a pivot end connection flange, a connection coupler, an alignment ring assembly, an alignment bracket, and a plurality of bearings.

The tower end extension connects to a tower end of a first pipe and may be a short hollow pipe or tube. The tower end extension may be angled so that its longitudinal axis is not parallel with a longitudinal axis of the first pipe.

The tower support structure mounts the tower end extension to the irrigation tower and may include a mounting bracket, a brace, a clamp, a mounting boss, or any other suitable structure. For example, the tower support structure may include an angled bracket for securing the joint assembly to a vertical leg of the irrigation tower.

The tower end connection flange mates with a flange of the tower end of the first pipe and may be angled so that its central axis extends approximately four degrees from the longitudinal axis of the tower end extension. In this way, the tower end extension may nominally extend horizontally while the tower end of the first pipe arches downward toward the tower end extension.

The pivot end extension connects to a pivot end of a second pipe and may be a short hollow pipe or tube. The pivot end extension may be angled so that its longitudinal axis is not parallel with a longitudinal axis of the second pipe. Note that the terms "pivot end extension" and "pivot end" are in reference to the second pipe (and its corresponding span) being pivotably connected to the tower, whereas the tower end of the first pipe is substantially rigidly connected to the tower via the tower end extension.

The pivot end connection flange mates with a flange of the pivot end of the second pipe and may be angled so that its central axis extends approximately four degrees from the longitudinal axis of the pivot end extension. In this way, the pivot end extension may nominally extend horizontally while the pivot end of the second pipe arches downward toward the pivot end extension.

The connection coupler fluidly connects the tower end extension to the pivot end extension and includes first and second shell halves and an inner rubber boot. The first and second shell halves may include semi-circular portions and flanged sides having fastener holes for securing the shell halves together. The semi-circular portions encircle adjacent ends of the tower end extension and pivot end extension and enclose the inner rubber boot therein. The rubber boot creates a continuous flexible conduit between the tower end extension and the pivot end extension.

The alignment ring assembly mechanically connects the tower end extension to the alignment bracket and includes an alignment ring, an upper support, and a lower support. In one embodiment, the alignment ring assembly provides yaw and pitch pivoting freedom between the tower end extension and the pivot end extension.

The alignment ring is a substantially rigid, vertically oriented gimbal nominally concentric with the longitudinal axis of the tower end extension. The alignment ring forms yaw connection points with the upper and lower supports and pitch connection points with the alignment bracket. The alignment ring may also include an elongated alignment arm configured to be linked to a controller for detecting misalignment between the adjacent irrigation spans.

The upper support extends upward and distally from the tower end extension and pivotably connects to the alignment ring at the upper yaw connection point. The lower support extends distally from the tower end extension and pivotably connects to the alignment ring at the lower yaw connection point.

The alignment bracket mechanically connects the alignment ring to the pivot end extension and includes a collar, laterally extending sections, and longitudinally extending sections. That is, the alignment bracket may essentially be a wishbone or U-shaped clevis.

The collar encircles the pivot end extension and is configured to rotate about a longitudinal axis of the pivot end extension. The collar also encloses some or all of the bearings. For example, the collar may enclose radial bearings and may be positioned between thrust bearings as explained below.

The laterally extending sections space the longitudinally extending sections from the collar. Meanwhile, the longitudinally extending sections each include a fastener hole on their distal ends for pivotably connecting the alignment bracket to the alignment ring at the pitch connection points.

The bearings rotatably support the alignment bracket, and more specifically the collar, on the pivot end extension. The bearings may include a radial bearing for reacting radial forces between the alignment bracket and the pivot end extension and a number of thrust bearings for reacting axial forces therebetween. In one embodiment, the collar encircles two radial bearings and is sandwiched between two thrust bearings. Alternatively, a single flanged sleeve bearing may be used, which reacts both radial forces and axial forces.

In use, the joint assembly allows the first and second pipes (and hence the adjacent irrigation spans) to move relative to each other with three degrees of freedom. That is, the joint assembly allows the first and second pipes to pitch, yaw, and roll relative to each other as the adjacent irrigation spans traverse a field.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 1:
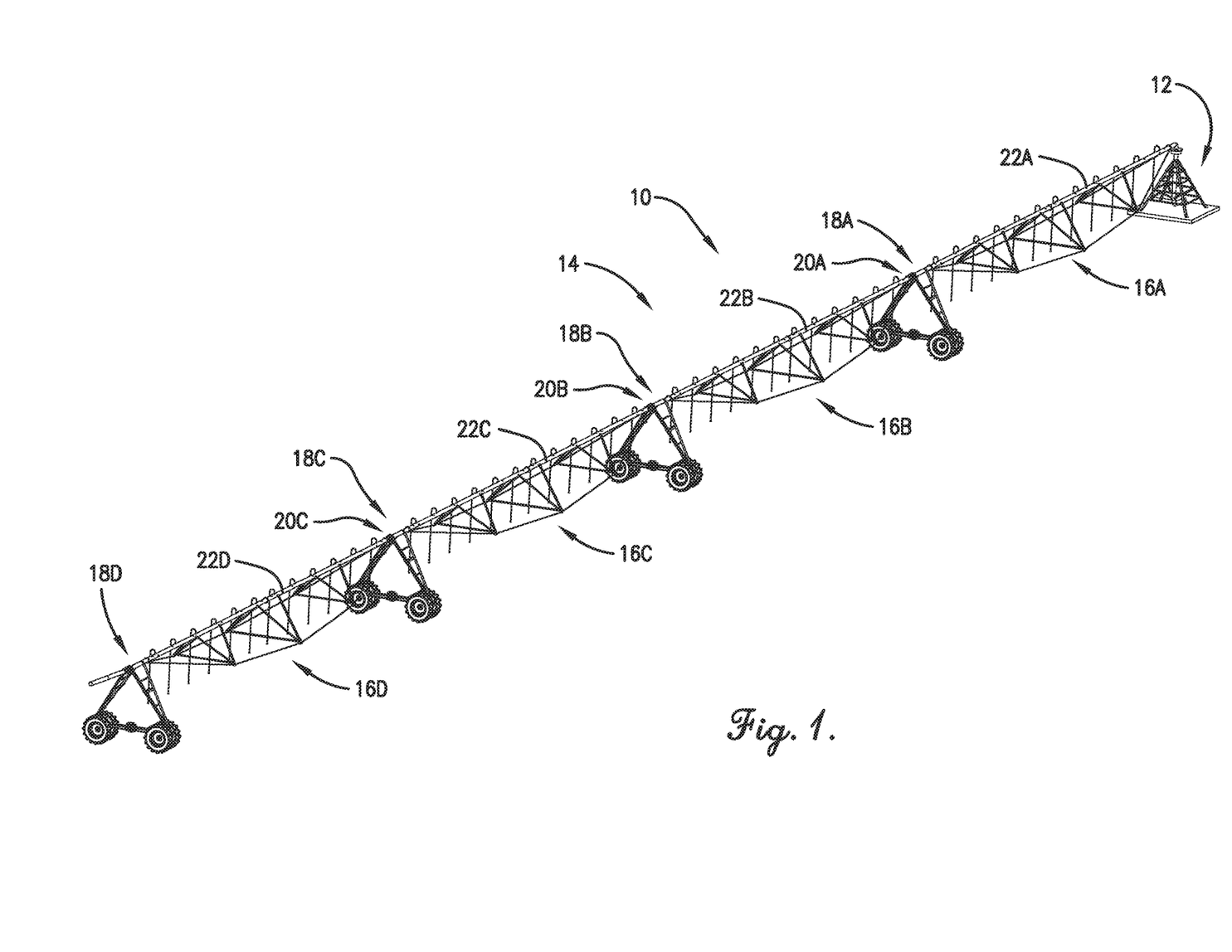
FIG. 1 is a perspective view of an irrigation system including a plurality of joint assemblies constructed in accordance with an embodiment of the invention.

Turning to the drawing figures, a mobile irrigation system 10 in which joint assemblies of the present invention may be incorporated is illustrated. The irrigation system 10 is a central pivot irrigation system broadly comprising a central pivot 12 and a main section 14 pivotably connected to the central pivot 12. Other irrigation systems such as linear move irrigation systems may also be used without departing from the scope of the invention.

The central pivot 12 distributes water or other fluids to the main section 14 and may be a tower, a standpipe, or the like. The central pivot 12 may include a support structure for withstanding radial loads, axial loads, and twisting loads, a non-rotatable vertically extending pipe, and a rotatable elbow. The non-rotatable vertically extending pipe carries the fluids to an elevated height. The rotatable elbow connects the main section 14 to the non-rotatable vertically extending pipe such that the main section 14 is free to pivot about the central pivot 12 while remaining connected thereto.

The main section 14 comprises a plurality of truss sections 16A-D, a plurality of support towers 18A-D, and a plurality of joint assemblies 20A-C. The main section 14 illustrated in FIG. 1 includes four truss sections, four support towers, and three joint assemblies; however, it may comprise any number of truss sections, support towers, and joint assemblies without departing from the scope of the present invention.

Each of the truss sections 16A-D carries or otherwise supports a pipe 22A-D or other fluid mechanism connected in fluid communication with the other conduit sections to form a number of interconnected spans. A plurality of sprinklers, spray guns, drop nozzles, or other fluid emitting devices are spaced along the pipes 22A-D to apply water and/or other fluids to ground areas underneath the irrigation system 10.

Each of the support towers 18A-D elevates adjacent truss sections 16A-D and may include an "A-frame" or similar structure for supporting an end of one of the truss sections 16A-D, a number of wheels connected to the A-frame for traversing across a field, and a motor for powering the wheels. Each support tower 18A-D may also include a controller for activating the motor according to a position of the support tower or a relative angle of the adjacent truss sections 16A-D.

The joint assemblies 20A-C are substantially identical and thus only joint assembly 20A will be described in more detail. The joint assembly 20A broadly comprises a tower end extension 24, tower support structure 26, a tower end connection flange 28, a pivot end extension 30, a pivot end connection flange 32, a connection coupler 34, an alignment ring assembly 36, an alignment bracket 38, and a plurality of bearings 40. The joint assembly 20A connects first and second pipes 22A,B of adjacent first and second spans (truss sections 16A, B).

The tower end extension 24 connects to a tower end of the first pipe 22A and may be a short hollow pipe or tube having an inner diameter substantially similar to an inner diameter of the first pipe 22A. The tower end extension 24 may also include truss rod anchors 42 for connecting truss rods of the first irrigation span thereto. The tower end extension 24 may be angled so that its longitudinal axis is not parallel with a longitudinal axis of the first pipe 22A.

The tower support structure 26 mounts the tower end extension 24 to the irrigation tower 18A and may include a mounting bracket, a brace, a clamp, a mounting boss, or any other suitable structure. For example, the tower support structure 26 may include an angled bracket having fastener holes for securing the joint assembly 10 to a vertical leg of the irrigation tower via bolts or other fasteners.

The tower end connection flange 28 mates with a flange of the tower end of the first pipe 22A and may include a plurality of fastener holes for receiving fasteners therethrough. The tower end connection flange 28 may be welded to the tower support structure 26 and may be angled so that its central axis extends approximately four degrees from the longitudinal axis of the tower end extension. In this way, the tower end extension 24 may nominally extend horizontally while the tower end of the first pipe 22A arches downward toward the tower end extension 24, which promotes coaxial rotation and improves alignment stability.

The pivot end extension 30 connects to a pivot end of the second pipe 22B and may be a short hollow pipe or tube having an inner diameter substantially similar to an inner diameter of the second pipe 22B. The pivot end extension 30 may also include truss rod anchors 44 for connecting truss rods of the second irrigation span thereto. The pivot end extension 30 may be angled so that its longitudinal axis is not parallel with a longitudinal axis of the second pipe 22B. Note that the terms "pivot end extension" and "pivot end" are in reference to the second pipe 22B (and its corresponding span) being pivotably connected to the tower 18A, whereas the tower end of the first pipe 22A is substantially rigidly connected to the tower 18A via the tower end extension 24.

The pivot end connection flange 32 mates with a flange of the pivot end of the second pipe 22B and may include a plurality of fastener holes for receiving fasteners therethrough. The pivot end connection flange 32 may be welded to the pivot end extension 30 and may be angled so that its central axis extends approximately four degrees from the longitudinal axis of the pivot end extension. In this way, the pivot end extension 30 may nominally extend horizontally while the pivot end of the second pipe 22B arches downward toward the pivot end extension 30, which promotes coaxial rotation and improves alignment stability.

Figure 2:
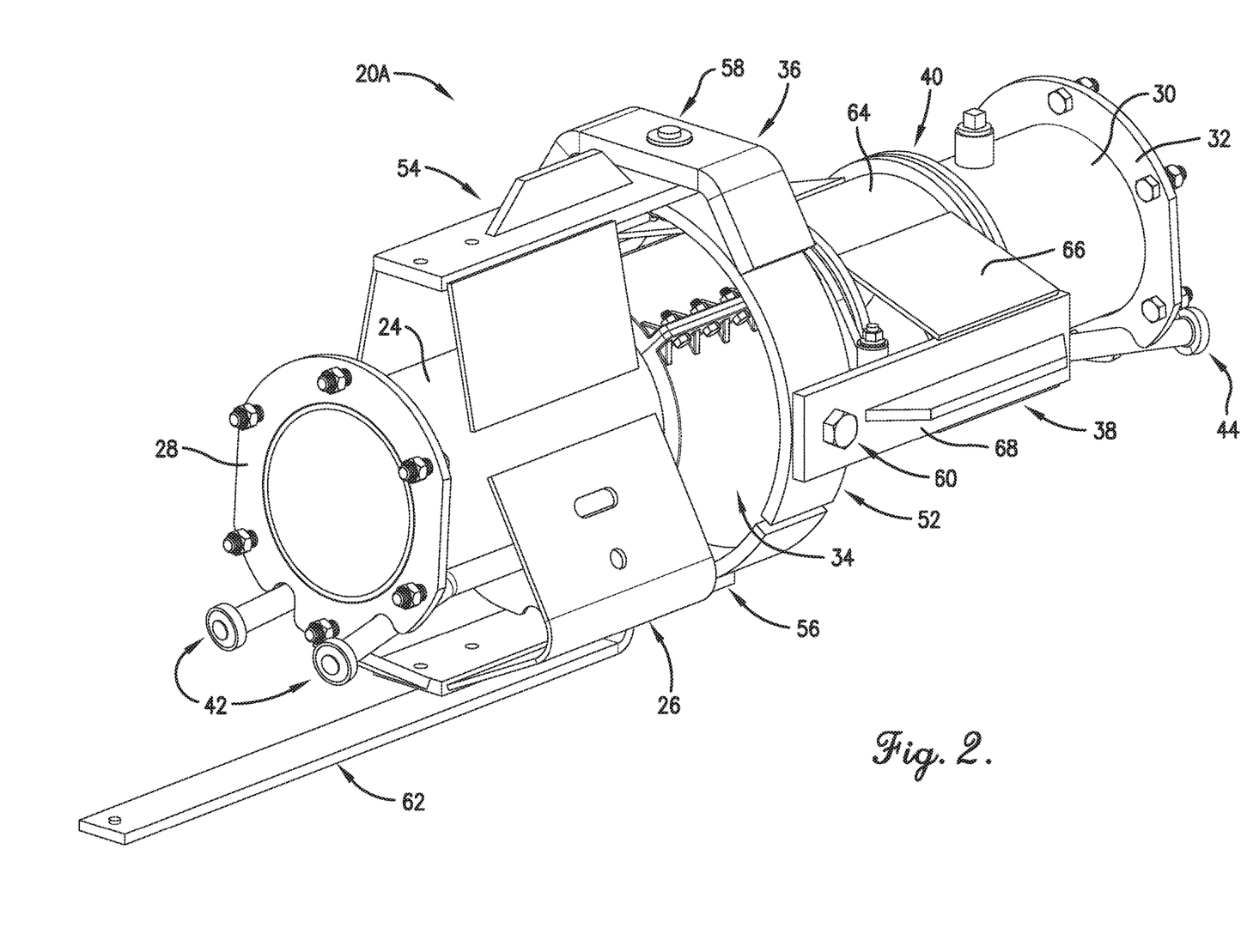
FIG. 2 is a front perspective view of a joint assembly constructed in accordance with an embodiment of the present invention.
Figure 3:
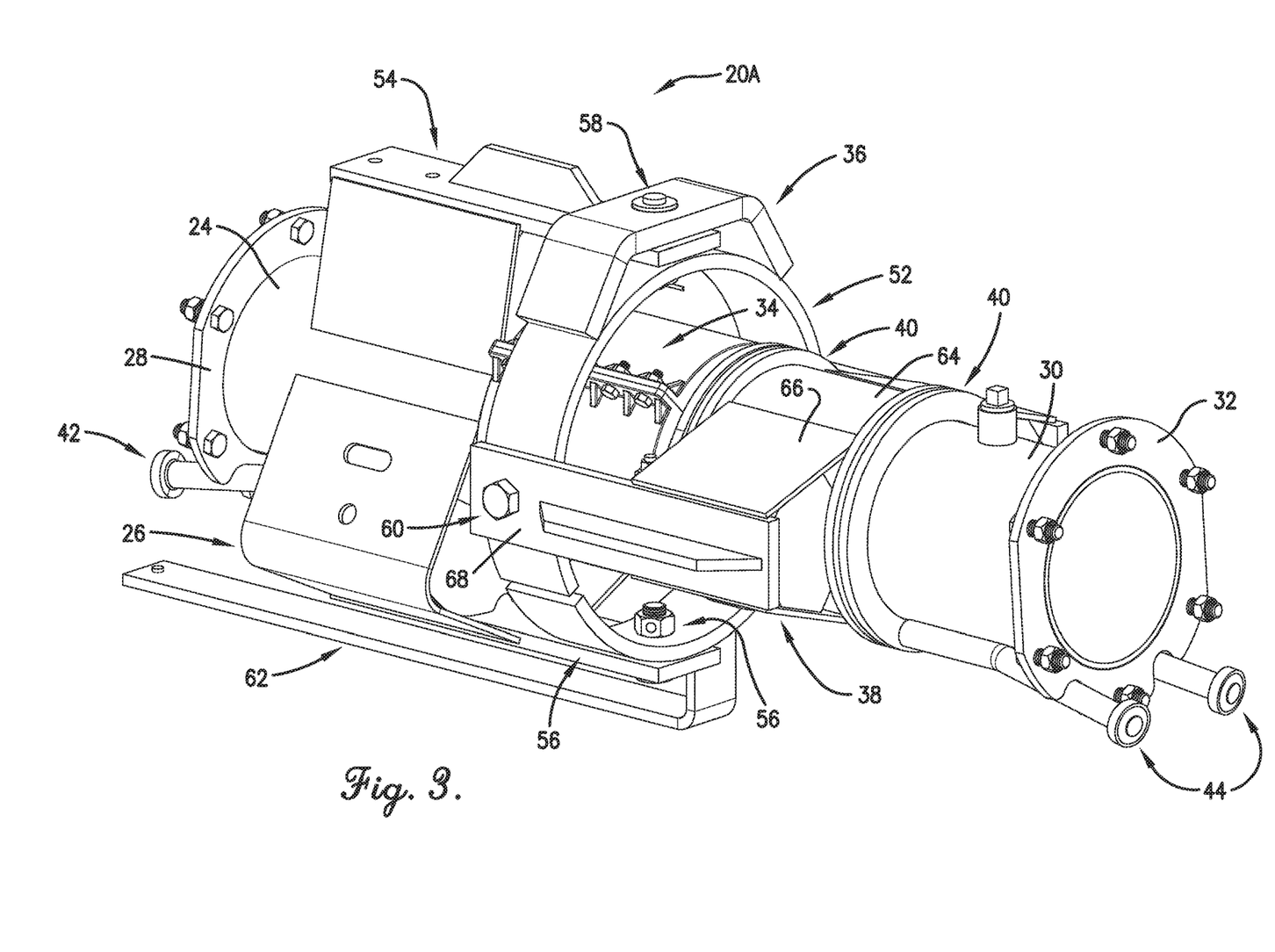
FIG. 3 is another front perspective view of the joint assembly of FIG. 2.
Figure 4:
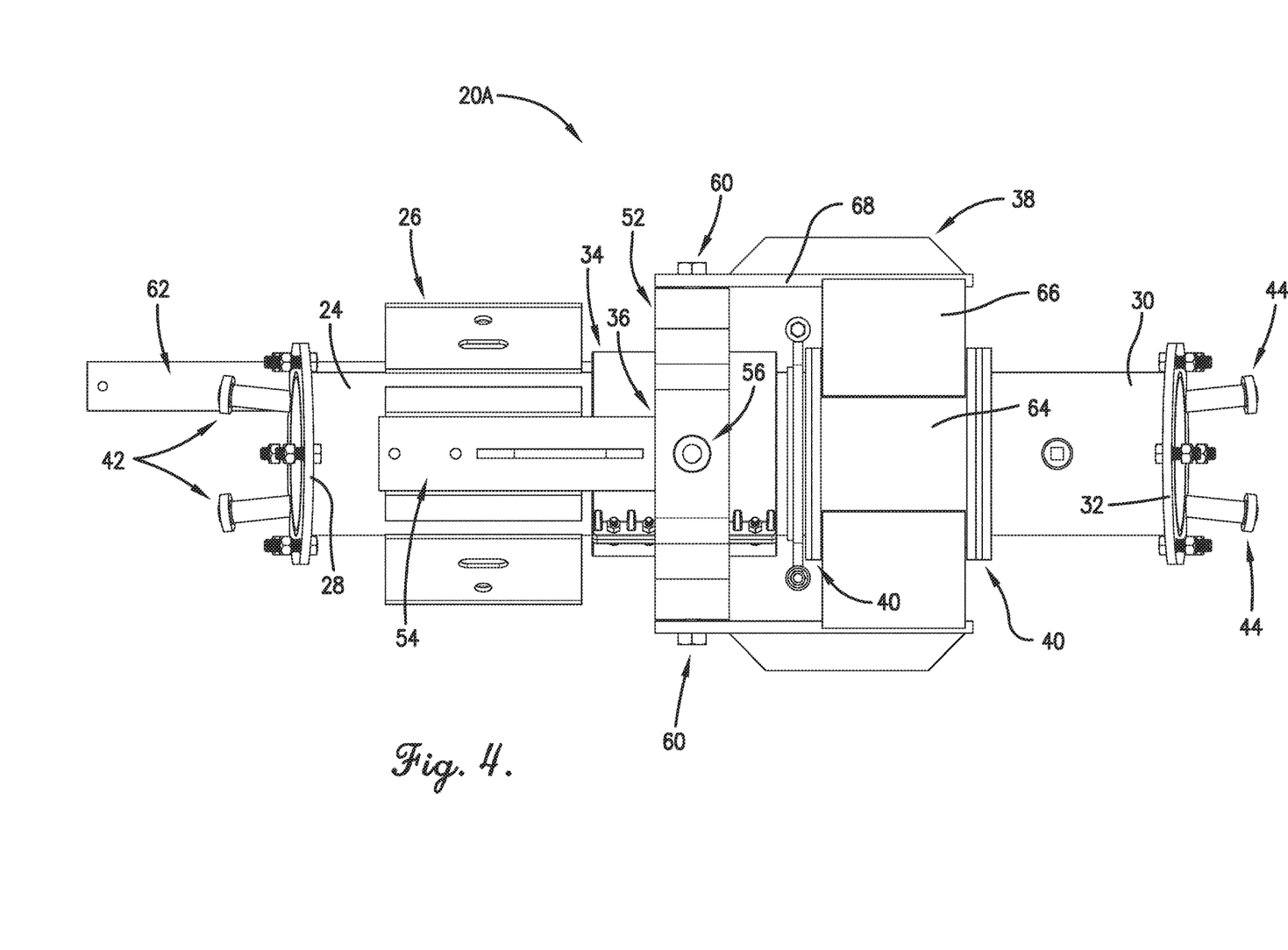
FIG. 4 is a plan view of the joint assembly of FIG. 2.
Figure 5:
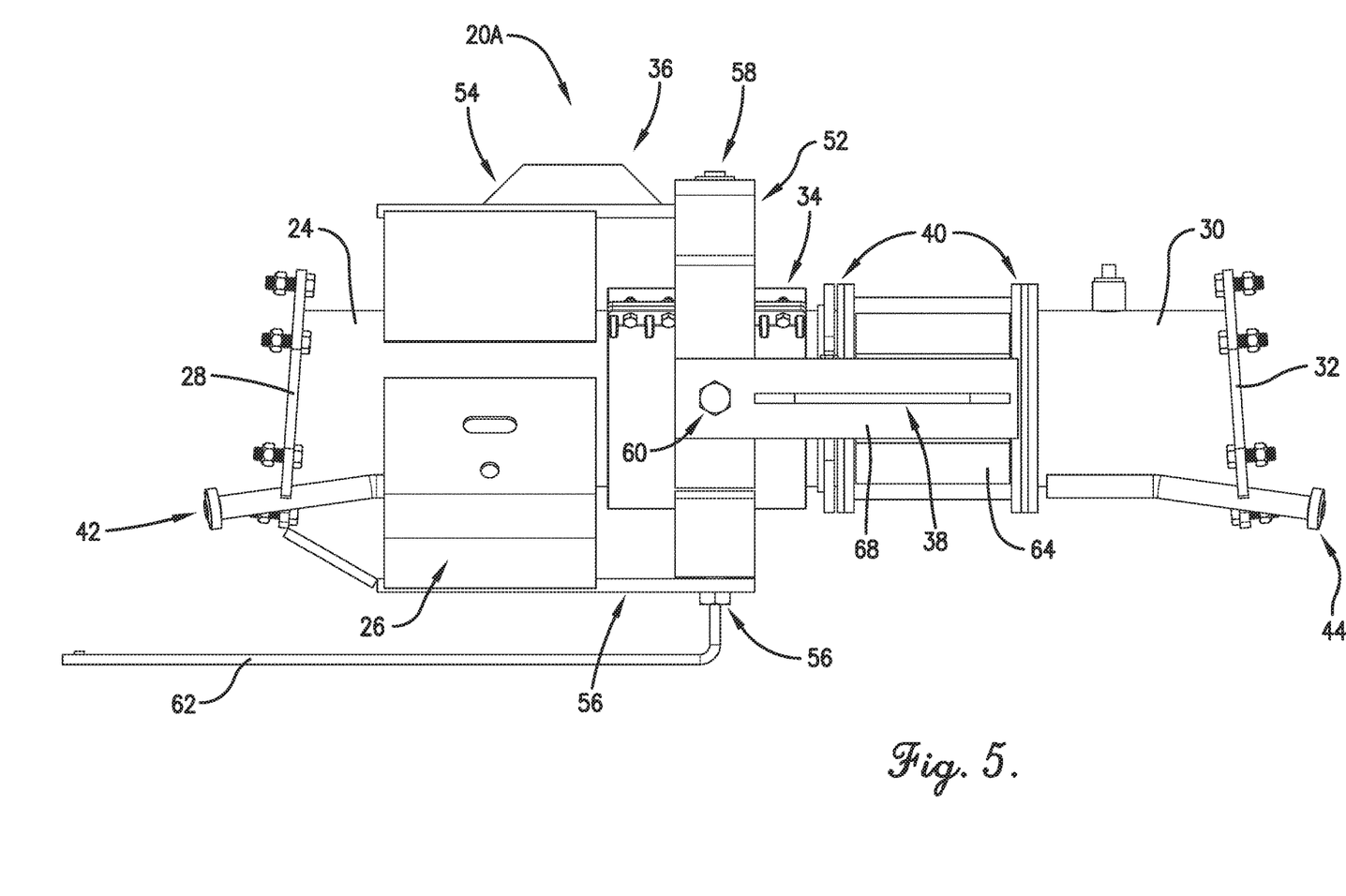
FIG. 5 is an elevation view of the joint assembly of FIG. 2.
Figure 6:
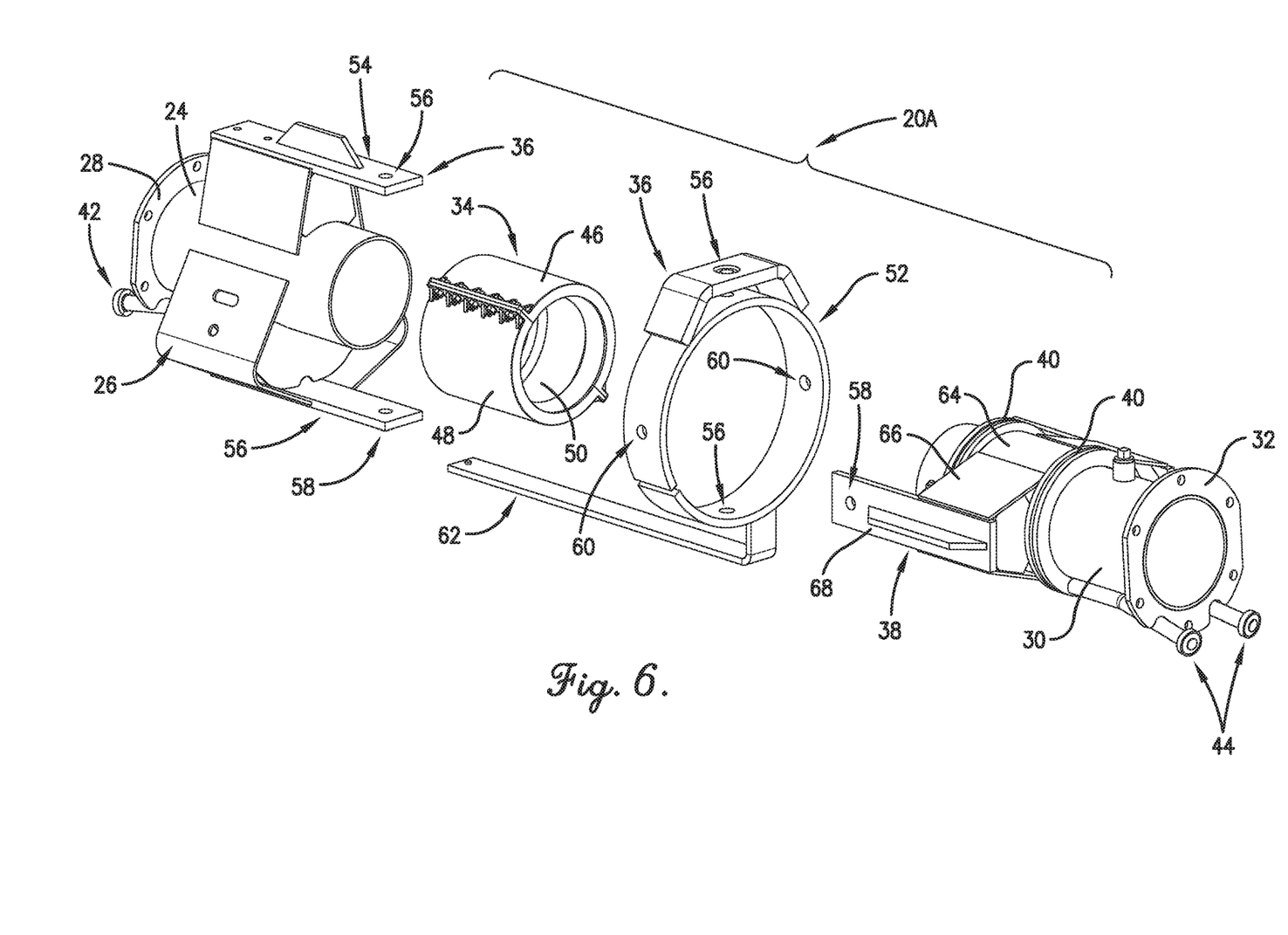
FIG. 6 is an exploded perspective view of the joint assembly of FIG. 2.

The connection coupler 34 fluidly connects the tower end extension 24 to the pivot end extension 30 and includes first and second shell halves 46, 48 and an inner rubber boot 50. The first and second shell halves 46, 48 may include semi-circular portions and flanged sides having fastener holes for securing the shell halves 46, 48 together. The semi-circular portions encircle adjacent ends of the tower end extension 24 and pivot end extension 30 and enclose the inner rubber boot 50 therein. The rubber boot 50 creates a continuous flexible conduit between the tower end extension 24 and the pivot end extension 30 and may be a hose, a band, or any other flexible tube, a gasket, or any other seal.

The alignment ring assembly 36 mechanically connects the tower end extension 24 to the alignment bracket 38 and includes an alignment ring 52, an upper support 54, and a lower support 56. In one embodiment, the alignment ring assembly 36 provides yaw and pitch pivoting freedom between the tower end extension 24 and the pivot end extension 30 as explained below.

The alignment ring 52 is a substantially rigid, vertically oriented gimbal nominally concentric with the longitudinal axis of the tower end extension 24. The alignment ring 52 may include fastener holes forming yaw connection points 58 (with the upper and lower supports 54, 56) near the top and bottom sides thereof and pitch connection points 60 (with the alignment bracket 38) near left and right sides thereof. The alignment ring 52 may also include an elongated alignment arm 62 extending toward the tower end of the first pipe 22A. The alignment arm 62 connects to a controller via a linkage near its distal end such that the controller can detect misalignment between the irrigation spans. The alignment ring 52 may be a relatively flat band or may have a circular cross section or any other suitable cross section. The alignment ring 52 may also include an annular gap for allowing the alignment ring 52 to flex out of plane slightly.

The upper support 54 extends upward and distally from the tower end extension 24 and pivotably connects to the alignment ring 52 at the upper yaw connection point 58. To that end, the upper support 54 may include a fastener hole near its distal end and a securement bracket for pivotably securing the alignment ring 52 to the upper support 54. The upper support 54 may include a reinforcement rib for reducing bending.

The lower support 56 extends distally from the tower end extension 24 and pivotably connects to the alignment ring 52 at the lower yaw connection point 58. To that end, the lower support 54 may include a fastener hole near its distal end for pivotably securing the alignment ring 52 to the lower support 56. In one embodiment, the lower support 56 extends from the tower support structure 26.

The alignment bracket 38 mechanically connects the alignment ring 52 to the pivot end extension 30 and includes a collar 64, left and right laterally extending sections 66, and left and right longitudinally extending sections 68. That is, the alignment bracket 38 may essentially be a wishbone or U-shaped clevis.

The collar 64 encircles the pivot end extension 30 and is configured to rotate about a longitudinal axis of the pivot end extension 30. The collar 64 also encloses some or all of the bearings 40. For example, the collar 64 may enclose radial bearings and may be positioned between thrust bearings as explained below.

The laterally extending sections 66 space the longitudinally extending sections 68 from the collar 64. Meanwhile, the longitudinally extending sections 68 each include a fastener hole on their distal ends for pivotably connecting the alignment bracket 38 to the alignment ring 52 at the pitch connection points 60. The longitudinally extending sections 68 may include a reinforcement rib for reducing bending.

The bearings 40 rotatably support the alignment bracket 38, and more specifically the collar 64, on the pivot end extension 30. The bearings 40 may include a radial bearing for reacting radial forces between the alignment bracket 38 and the pivot end extension 30 and a number of thrust bearings for reacting axial forces therebetween. In one embodiment, the collar 64 encircles two radial bearings and is sandwiched between two thrust bearings. Alternatively, a single flanged sleeve bearing may be used, which reacts both radial forces and axial forces. The bearings may be ultra-high molecular weight polyethylene (UHMWPE), which provides a very low coefficient of friction and is extremely abrasion resistant, or any other suitable material. The bearings require no annual lubrication or maintenance (i.e., no oil or grease is required) and are replaceable in the field as required throughout the life of the joint assembly 20A.

In use, the joint assembly 20A allows the first and second pipes 22A,B (and hence the adjacent irrigation spans) to move relative to each other with three degrees of freedom (pitch, yaw, and roll). For example, the spans can pivot relative to each other about the pitch connection points 60 as they traverse uneven ground. The spans can pivot relative to each other about the yaw connection points 58 as they advance along respective paths. The spans can roll relative to each other via the alignment bracket 38 and the bearings 40 as they lean forward and backward on the uneven ground.

The joint assemblies 20A-C provide several advantages. For example, the joint assemblies 20A-C release torsional energy via the alignment bracket 38 and bearings 40. This allows the towers 18A-D and irrigation spans to more easily traverse uneven terrain. The joint assemblies 20A-C allow extreme transverse rotation up to 42% slope on spans of any length. The joint assemblies 20A-C are also compatible with 6⅝" spans. The use of two UHMWPE radial bearings promotes low coefficient of friction at their interface and allows minimal interface surface preparation of the pivot end extension 30. The bearings 40 also do not slide on the pivot end extension 30. Thrust bearings provide a low friction surface and promote free rotation under heavy system lateral loads. The tower end connection flange 28 and pivot end connection flange 32 are rotated to interface with mating pipe flanges such that pipe rotation occurs along the nominal axes of the joint assemblies 20A-C and the alignment ring 52.

The joint assemblies 20A-C interface to existing spans and to existing pipe flanges. No special alignment is required (i.e., standard alignments can be used). Split couplers can be installed and removed with the joint assemblies 20A-C fully assembled. The bearings 40 can be easily replaced in the field if necessary over the life of the irrigation system and joint assemblies 20A-C.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A joint assembly for joining first and second pipes on a tower of an irrigation system, the first pipe having a tower end and the second pipe having a pivot end positioned near the tower end of the first pipe, the joint assembly comprising:
   a tower end extension configured to be connected to the tower end of the first pipe, the tower end extension having a longitudinal axis;
   a pivot end extension configured to be connected to the pivot end of the second pipe and having a longitudinal axis independent from the longitudinal axis of the tower end extension;
   an alignment ring connected to the tower end extension and being configured to yaw relative to the tower end extension about a first axis substantially perpendicular to the longitudinal axis of the tower end extension;
   an alignment bracket connected to the alignment ring and the pivot end extension, the alignment bracket including:
      a collar encircling the pivot end extension;
      a laterally extending section connected to the collar; and
      a longitudinally extending section connected to the laterally extending section; and
   a plurality of bearings rotatably supporting the alignment bracket on the pivot end extension, the plurality of bearings including a radial bearing for reacting radial forces between the alignment bracket and the pivot end extension and a thrust bearing for reacting axial forces between the alignment bracket and the pivot end extension,
   the alignment ring being connected to the longitudinally extending section of the alignment bracket and being configured to pitch relative to the longitudinally extending section of the alignment bracket about a second axis substantially perpendicular to the first axis and substantially perpendicular to the longitudinal axis of the tower end extension,
   the collar of the alignment bracket being configured to rotate relative to the pivot end extension about the longitudinal axis of the pivot end extension.

2. The joint assembly of claim 1, further comprising a radial-thrust bearing pivotably supporting the alignment bracket on the pivot end extension.

3. The joint assembly of claim 1, further comprising an alignment ring assembly including the alignment ring and an upper alignment ring support and a lower alignment ring support connected to the tower end extension, the alignment ring being configured to yaw relative to the upper alignment ring support and lower alignment ring support.

4. The joint assembly of claim 1, further comprising a connection coupler fluidly connecting the tower end extension and the pivot end extension.

5. The joint assembly of claim 4, wherein the connection coupler includes an upper shell, a lower shell connected to the upper shell, and an inner rubber boot, the upper shell and lower shell encircling the inner rubber boot.

6. The joint assembly of claim 1, wherein the alignment ring includes an annular gap for allowing the alignment ring to flex slightly.

7. The joint assembly of claim 1, further comprising a tower end connection flange for connecting the tower end extension to the first pipe and a pivot end connection flange for connecting the pivot end extension to the second pipe.

8. A mobile irrigation system comprising:
   a plurality of irrigation spans each including a truss support and a pipe connected to pipes of adjacent irrigation spans;
   a plurality of mobile irrigation towers supporting the irrigation spans, each mobile irrigation tower comprising:
      a tower frame configured to support the irrigation spans;
      a plurality of wheels attached to the tower frame for traversing a field; and
      a motor drivably connected to one of the wheels; and
   a plurality of joint assemblies for joining first and second pipes of adjacent irrigation spans, each joint assembly comprising:
      a tower end extension configured to be connected to the first pipe, the tower end extension having a longitudinal axis;
      structure for supporting the joint assembly on the tower via the tower end extension;
      a pivot end extension configured to be connected to the second pipe and having a longitudinal axis independent from the longitudinal axis of the tower end extension;
      an alignment ring connected to the tower end extension and being configured to yaw relative to the tower end extension about a first axis substantially perpendicular to the longitudinal axis of the tower end extension;
      an alignment bracket connected to the alignment ring and the pivot end extension, the alignment bracket including:
         a collar encircling the pivot end extension,
         a laterally extending section connected to the collar, and
         a longitudinally extending section connected to the laterally extending section; and
      a plurality of bearings rotatably supporting the alignment bracket on the pivot end extension, the plurality of bearings including a radial bearing for reacting radial forces between the alignment bracket and the pivot end extension and a thrust bearing for reacting axial forces between the alignment bracket and the pivot end extension,
      the alignment ring being connected to the longitudinally extending section of the alignment bracket and being configured to pitch relative to the longitudinally extending section of the alignment bracket about a second axis substantially perpendicular to the first axis and substantially perpendicular to the longitudinal axis of the tower end extension,
the collar of the alignment bracket being configured to rotate relative to the pivot end extension about the longitudinal axis of the pivot end extension.

9. The mobile irrigation system of claim 8, wherein each joint assembly further comprises a radial-thrust bearing pivotably supporting the alignment bracket on the pivot end extension.

10. The mobile irrigation system of claim 8, wherein each joint assembly further comprises an alignment ring assembly including the alignment ring and an upper alignment ring support and a lower alignment ring support connected to the tower end extension, the alignment ring being configured to yaw relative to the upper alignment ring support and lower alignment ring support.

11. The mobile irrigation system of claim 8, wherein each joint assembly further comprises a connection coupler fluidly connecting the tower end extension and the pivot end extension.

12. The mobile irrigation system of claim 11, wherein the connection coupler includes an upper shell, a lower shell connected to the upper shell, and an inner rubber boot, the upper shell and lower shell encircling the inner rubber boot.

13. The mobile irrigation system of claim 8, wherein the alignment ring includes an annular gap for allowing the alignment ring to flex slightly.

14. An irrigation tower for supporting adjacent irrigation spans including a first pipe having a tower end and a second pipe having a pivot end, the irrigation tower comprising:
a tower frame configured to support the irrigation spans;
a plurality of wheels attached to the tower frame for traversing a field;
a motor drivably connected to one of the wheels; and
a joint assembly for joining the first and second pipes, the joint assembly comprising:
a tower end extension configured to be connected to the tower end of the first pipe, the tower end extension having a longitudinal axis;
a tower end connection flange for connecting the tower end extension to a flange of the tower end of the first pipe, the tower end connection flange having a central axis angled relative to the longitudinal axis of the tower end extension;
structure for supporting the joint assembly on the tower via the tower end extension;
a pivot end extension configured to be connected to the pivot end of the second pipe and having a longitudinal axis independent from the longitudinal axis of the tower end extension;
a pivot end connection flange for connecting the pivot end extension to a flange of the pivot end of the second pipe, the pivot end connection flange having a central axis angled relative to the longitudinal axis of the pivot end extension;
an alignment ring assembly comprising:
an upper alignment ring support and a lower alignment ring support connected to the tower end extension; and
an alignment ring extending from the upper alignment ring support and the lower alignment ring support and being configured to yaw relative to the upper alignment ring support and the lower alignment ring support about a first axis substantially perpendicular to the longitudinal axis of the tower end extension, the alignment ring having an annular gap for allowing the alignment ring to flex slightly;
an alignment bracket connected to the alignment ring and the pivot end extension, the alignment bracket including:
a collar encircling the pivot end extension;
a laterally extending section connected to the collar; and
a longitudinally extending section connected to the laterally extending section,
the alignment ring being connected to the longitudinally extending section of the alignment bracket and being configured to pitch relative to the longitudinally extending section of the alignment bracket about a second axis substantially perpendicular to the first axis and substantially perpendicular to the longitudinal axis of the tower end extension,
the collar of the alignment bracket being configured to rotate relative to the pivot end extension about the longitudinal axis of the pivot end extension;
a radial bearing positioned between the collar of the alignment bracket and the pivot end extension for allowing the collar of the alignment bracket to rotate about the longitudinal axis of the pivot end extension; and
a thrust bearing near the collar of the alignment bracket for reacting axial forces between the collar of the alignment bracket and the pivot end extension.

* * * * *